US009010516B2

(12) United States Patent
Nishihara

(10) Patent No.: US 9,010,516 B2
(45) Date of Patent: Apr. 21, 2015

(54) TRAVELING TYPE IMMERSION TREATMENT APPARATUS

(71) Applicant: Shigeyoshi Nishihara, Shiga (JP)

(72) Inventor: Shigeyoshi Nishihara, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 14/481,133

(22) Filed: Sep. 9, 2014

(65) Prior Publication Data

US 2014/0374214 A1 Dec. 25, 2014

Related U.S. Application Data

(63) Continuation of application No. PCT/JP2012/062156, filed on May 11, 2012.

(51) Int. Cl.
*B65G 49/04* (2006.01)
*B65G 17/48* (2006.01)
*B65G 17/00* (2006.01)

(52) U.S. Cl.
CPC ............. *B65G 17/48* (2013.01); *B65G 17/005* (2013.01)

(58) Field of Classification Search
USPC ........... 198/346.3, 377.02; 118/416, 423, 426
See application file for complete search history.

(56) References Cited

U.S. PATENT DOCUMENTS

| 5,725,669 A * | 3/1998 | Heckmann .................... 118/423 |
| 6,676,755 B2 * | 1/2004 | Ehrenleitner et al. ........ 118/423 |
| 6,706,117 B2 * | 3/2004 | Ehrenleitner et al. ........ 118/423 |
| 6,991,087 B2 * | 1/2006 | Krannich et al. .......... 198/465.1 |
| 7,238,392 B2 * | 7/2007 | Kyotani .................... 427/430.1 |
| 7,484,616 B2 * | 2/2009 | Nakamura ................ 198/465.4 |
| 8,561,780 B2 * | 10/2013 | Albeck et al. ............. 198/346.3 |
| 8,590,481 B2 * | 11/2013 | Nishihara et al. ............. 118/423 |
| 8,590,482 B2 * | 11/2013 | Nishihara et al. ............. 118/425 |
| 8,602,203 B2 * | 12/2013 | Nishihara et al. ........ 198/468.11 |
| 8,807,328 B2 * | 8/2014 | Schurba ........................ 198/680 |

FOREIGN PATENT DOCUMENTS

| JP | 2008100223 A | 5/2008 |
| JP | 2012016642 A | 1/2012 |
| WO | 0249943 A1 | 6/2002 |

\* cited by examiner

*Primary Examiner* — Douglas Hess
(74) *Attorney, Agent, or Firm* — St. Onge Steward Johnston & Reens LLC

(57) ABSTRACT

A traveling type immersion treatment apparatus for a vehicle body has a speed control device which controls the traveling speed of the conveying traveling body according to the angle of rotation of a rotary shaft that rotates the vehicle body. Between an upright position and a 90° rotation position the forward speed of the conveying traveling body is gradually decreased in relation to a reference conveying speed; then the forward speed of the conveying traveling body is gradually increased in relation to the reference conveying speed until the vehicle body reaches a 270° rotation position from the 90° rotation position; and then the forward speed of the conveying traveling body is gradually decreased in relation to the reference conveying speed until the vehicle body returns to the original upright position from the 270° rotation position.

6 Claims, 10 Drawing Sheets

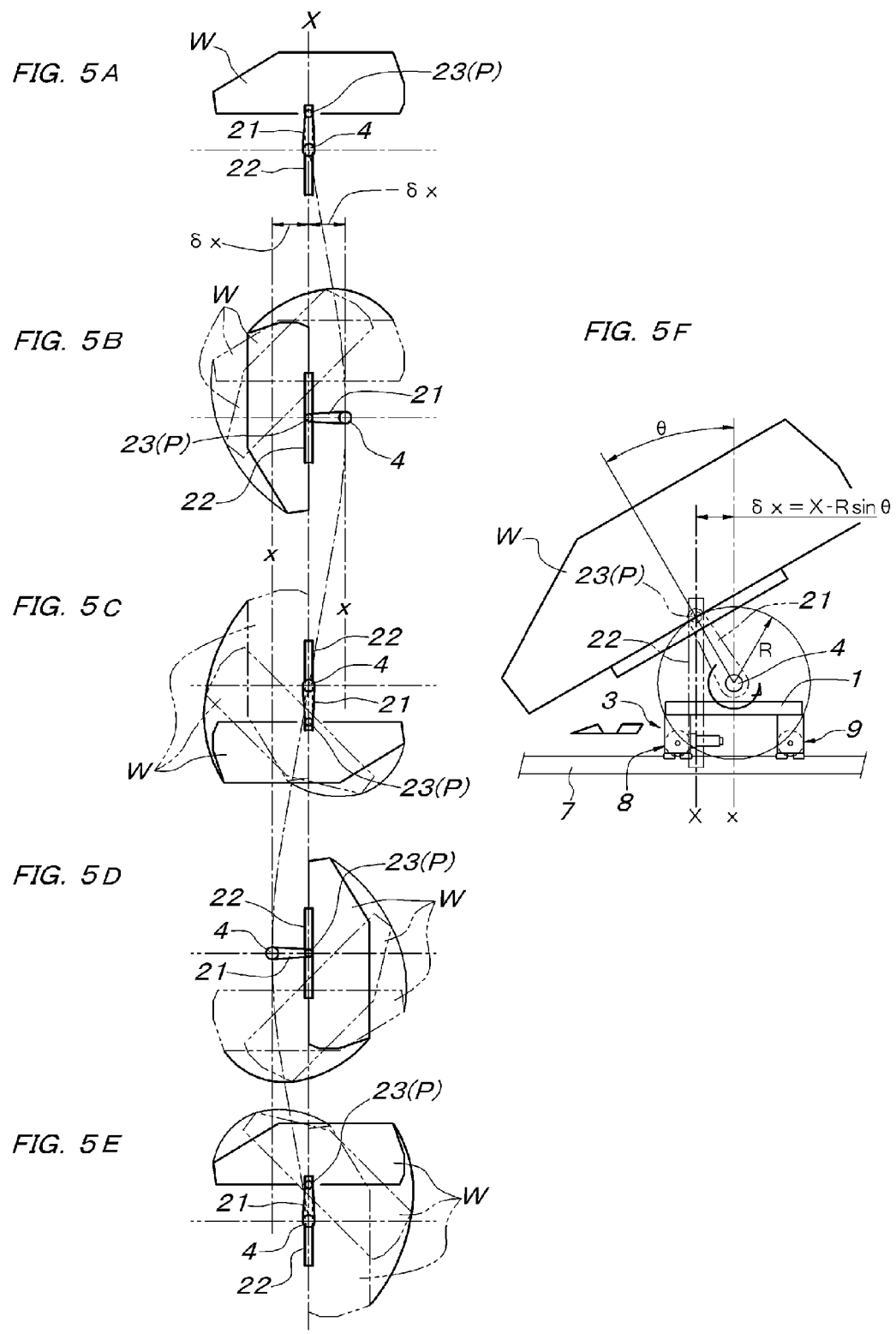

TRAVELING TYPE IMMERSION TREATMENT APPARATUS

FIELD OF THE INVENTION

The invention relates to a traveling type immersion treatment apparatus for a vehicle body of an automobile.

BACKGROUND OF THE INVENTION

There is known, as the traveling type immersion treatment apparatus, one that a conveying traveling body traveling along an immersion treatment bath is provided with a rotary shaft horizontally crossing above the immersion treatment bath and a rotary shaft drive means rotationally driving the rotary shaft, and the rotary shaft is provided with a workpiece supporting means, and a workpiece to be treated having been supported by this workpiece supporting means can be immersed within the immersion treatment bath by rotation of the rotary shaft, as described in Japanese unexamined patent application publication No. 2008-100223.

SUMMARY OF THE INVENTION

When a prior known type of traveling type immersion treatment apparatus is used in a coating system for a vehicle body of an automobile, a long and large-sized vehicle body is rotated about the rotary shaft located below the vehicle body while the vehicle body is supported along a length direction thereof parallel to a conveying direction, as conventionally known. When the rotary shaft in a fixed position on a conveying traveling body is driven to be turned toward the forward rolling direction while the vehicle body is located above the immersion treatment bath in order to immerse the vehicle body within the immersion treatment bath, a forward rolling locus of the vehicle body in an upright position of being horizontally supported on an upper side of the rotary shaft in the fixed position becomes a perfect circle in which the rotary shaft is the center and a distance from the rotary shaft to a corner portion of the vehicle body at the most distant position from the rotary shaft is the radius, and the forward rolling locus of the vehicle body juts out more forward and rearward in the traveling direction of the conveying traveling body than front and rear end positions of the vehicle body in the upright position. Consequently, to prevent a vehicle body turning in the forward rolling manner from interfering with vehicle bodies supported by preceding and following conveying traveling bodies, a pitch between the conveying traveling bodies needs to be significantly broadened as compared with the entire length of the vehicle body. As a result, not only is conveyance efficiency reduced but also the entire length of the immersion treatment bath is increased, wherewith equipment costs and running costs become expensive.

The invention provides a traveling type immersion treatment apparatus capable of solving the foregoing conventional problems. Described by giving reference symbols in parentheses used in the description of embodiments described below in order to facilitate understanding the relationship with the embodiments, the traveling type immersion treatment apparatus according to the invention is a traveling type immersion treatment apparatus configured such that a conveying traveling body (1) traveling along an immersion treatment bath (2) is provided with a rotary shaft (4) horizontally crossing above the immersion treatment bath (2) and a rotary shaft drive means (5) rotationally driving the rotary shaft (4), and the rotary shaft (4) is provided with a workpiece supporting means (14), and a workpiece to be treated (a vehicle body W) supported by this workpiece supporting means (14) can be immersed within the immersion treatment bath (2) by rotation of the rotary shaft (4), wherein the conveying traveling body (1) is provided with a traveling speed variable travel drive means (3) and a traveling speed control device (6) controlling the traveling speed of the conveying traveling body (1) in response to an angle of rotation ($\theta$) of the rotary shaft (4), and the traveling speed control device (6) performs control such that until the workpiece (the vehicle body W) supported by the workpiece supporting means (14) reaches a 90° rotation position in a forward rolling direction from an upright position of being horizontally positioned just above the rotary shaft (4), a forward speed of the conveying traveling body (1) is gradually decreased with respect to a reference conveying speed of a reference position (P) on the side of the workpiece at a fixed distance from the rotary shaft (4), and the forward speed of the conveying traveling body (1) is gradually increased with respect to the reference conveying speed until the workpiece (the vehicle body W) reaches a 270° rotation position from the 90° rotation position, and the forward speed of the conveying traveling body (1) is gradually decreased with respect to the reference conveying speed until the workpiece (the vehicle body W) returns to the original upright position from the 270° rotation position, and a forward rolling locus of the workpiece (the vehicle body W), assuming that the reference conveying speed is zero is configured to be a vertically long shape.

According to the foregoing configuration of the invention, the forward rolling locus of the workpiece can be changed from the perfect circle to the vertically long shape where the width in the front-rear horizontal direction is narrow, by only increasing or decreasing the forward speed of the conveying traveling body when the rotary shaft on the conveying traveling body traveling forward is rotated to turn the workpiece in the forward rolling direction. Therefore, when one workpiece supported by the conveying traveling body positioned above the immersion treatment bath is turned in the forward rolling manner to immerse the workpiece within the immersion treatment bath, the length in the traveling direction of the conveying traveling body of the immersion treatment bath can be shortened, wherewith floor utilization efficiency can be enhanced and equipment costs can be reduced.

Where a plurality of conveying traveling bodies are arranged in series and traveled, each conveying traveling body (1) traveling on the same traveling path is arranged such that intervals in the conveying traveling body traveling direction between the reference positions (P) on the side of the workpieces in the respective conveying traveling bodies (1) become equal, and each conveying traveling body (1) can be traveled forward by the traveling speed control device (6) such that the reference conveying speed relative to the reference position (P) on the side of the workpiece of each conveying traveling body (1) becomes equal to each other. By employing this configuration, the constraint that the pitch between the conveying traveling bodies need to be widened significantly as compared with the entire length of the workpiece in order to prevent the workpiece turning in the forward rolling manner from interfering with workpieces in the upright position or workpieces similarly turning in the forward rolling manner which are supported by front and rear conveying traveling bodies as in the conventional manner is eliminated. Accordingly, not only can the pitch between the conveying traveling bodies be narrowed to enhance conveyance efficiency, but also the entire length of the immersion treatment bath for treating a plurality of workpieces simultaneously by immersion can be shortened and reduction of equipment costs and running costs can be achieved.

Further, to be more precise, the traveling speed control device (6) in the invention can have traveling speed control over the conveying traveling body (1) such that $$\delta x = X - R \sin \theta$$

holds where a vertical coordinate axis passing through the reference position P on the workpiece side is a reference coordinate axis X, a vertical coordinate axis passing through an axial center of the rotary shaft (4) is a control target coordinate axis x, an amount of displacement in the conveying traveling body traveling direction of the control target coordinate axis x with respect to the reference coordinate axis X caused as a result of the traveling speed control over the conveying traveling body (1) is δx, the radius of rotation of the reference position (P) about the rotary shaft (4) is R, the angle of rotation of the rotary shaft (4) is θ, and the angle of rotation θ at the time when the workpiece (the vehicle body W) is in the upright position and the reference coordinate axis X and the control target coordinate axis x agree is zero. In other words, a speed control program for performing the traveling speed control over the conveying traveling body (1) according to the foregoing condition is set in the traveling speed control device in advance, whereby the invention can be carried out simply and easily.

Further, where a plurality of conveying traveling bodies are arranged in series and traveled, there is a possibility that workpieces supported by front and rear adjacent conveying traveling bodies interfere with each other at least at the time of being turned in the forward rolling manner for the immersion treatment if the interval between the front and rear adjacent conveying traveling bodies is accidentally narrowed beyond an allowable range due to a failure of the travel drive means or traveling speed control device, etc., accumulation of errors in the speed control by the traveling speed control device, or sliding at the time of traveling of the conveying traveling body, etc., therewith bringing about an extremely dangerous situation. In such a case, each conveying traveling body (1) can be provided with a detection means (25) detecting a state that an interval in the conveying traveling body traveling direction between the reference positions (P) on the side of the workpieces of the front and rear adjacent conveying traveling bodies (1) is narrowed. According to this configuration, reaching this situation can be detected by the detection means before the interval between the front and rear adjacent conveying traveling bodies is accidentally narrowed beyond the allowable range. Thus, necessary emergency measures such as automatic stop of each conveying traveling body, sounding of an alarm, etc., are automatically performed based on the detection signal of the detection means, therewith being able to avoid reaching the dangerous situation as above before it happens.

It can be configured such that a distance sensor, etc., measuring and detecting the interval between the front and rear adjacent conveying traveling bodies is provided as the detection means for example and an abnormal condition detection signal is output when the interval between the front and rear adjacent conveying traveling bodies detected by this distance sensor, etc., becomes a set value or less. However, the detection means (25) is preferably configured as follows.

That is, the detection means (25) can be constituted of a rod-shaped movable body (26) supported to the conveying traveling body (1) so as to be reciprocable in the traveling direction, a vertical guide rail (27) attached to this rod-shaped movable body (26), a revolving arm (28) rotating together with the rotary shaft (4), an engaging member (a roller 29) pivotally supported to a distal end side of this revolving arm (28) so as to agree with the reference position (P) on the workpiece (the vehicle body W) side, the engaging member vertically movably engaged with the guide rail (27), a portion to be detected (30) provided for one end of the rod-shaped movable body (26), and a detector (31) provided for the other end of the rod-shaped movable body (26) and detecting the portion to be detected (30) of the rod-shaped movable body (26) of the adjacent conveying traveling bodies (1) when the interval in the conveying traveling body traveling direction between the reference positions (P) on the side of the workpieces of the front and rear adjacent conveying traveling bodies (1) is narrowed.

According to the foregoing configuration of the detection means (25), that the interval between the front and rear adjacent conveying traveling bodies is abnormally narrowed can be detected mechanically without fail even if an end portion in the traveling direction of the conveying traveling body does not have a structure or shape suitable as a detected surface of the distance sensor, etc., therewith being able to avoid reaching the dangerous situation as above without fail. Moreover, it is also possible that the rod-shaped movable bodies respectively provided for the front and rear adjacent conveying traveling bodies are configured to abut against each other when the interval between the front and rear adjacent conveying traveling bodies is abnormally narrowed, and a minimum interval between the front and rear adjacent conveying traveling bodies is mechanically secured. Safety can further be enhanced.

BRIEF DESCRIPTION OF THE DRAWINGS

FIGS. 5A to 5E are explanatory diagrams of operation in the conveying traveling body shown in FIG. 4, and FIG. 5F is an explanatory diagram explaining basis for a formula used in the traveling speed control in the embodiment of the invention.

DETAILED DESCRIPTION OF THE INVENTION

Figure 1:
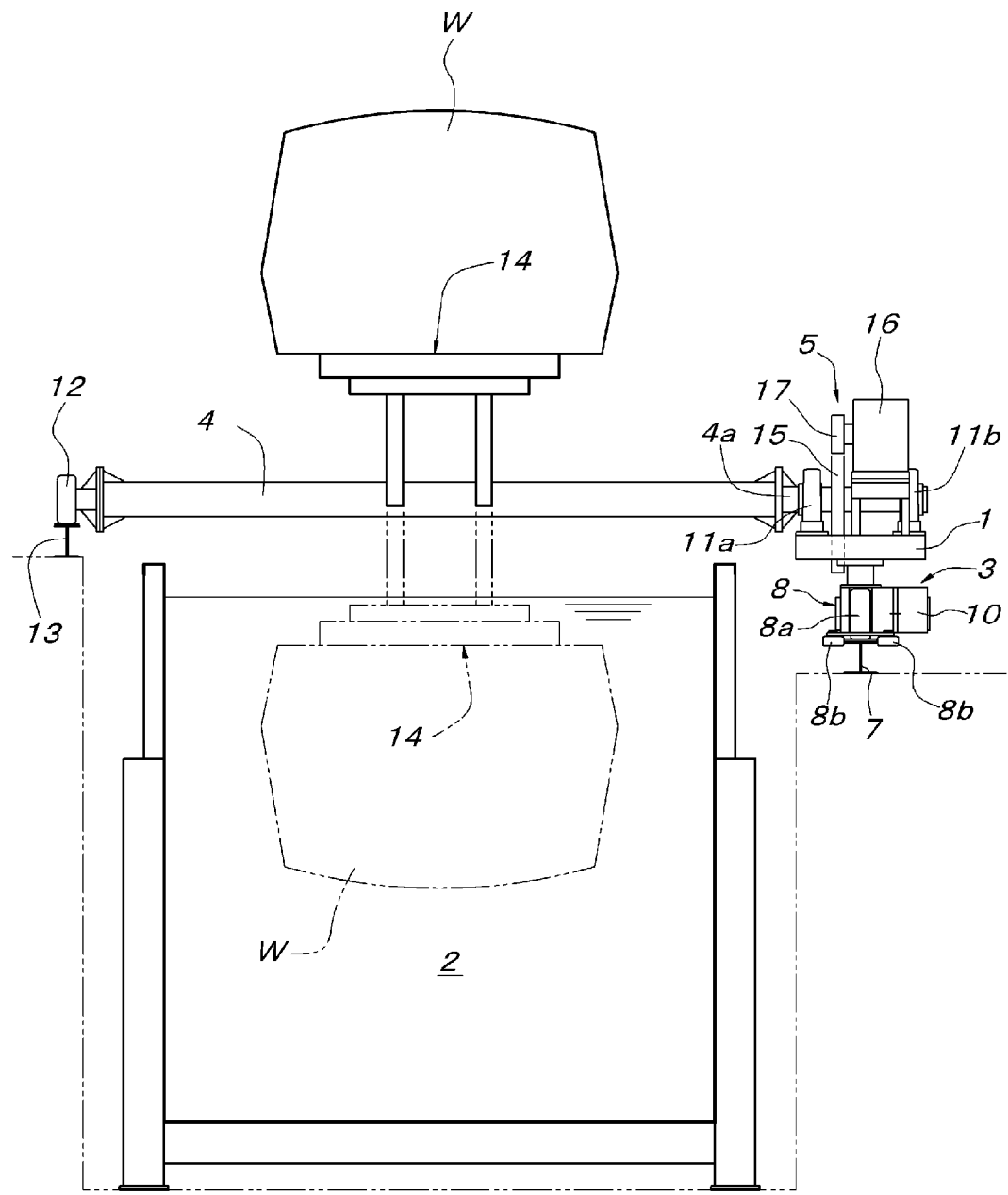
FIG. 1 is a partial longitudinal sectional front view showing one embodiment of the invention.

A hardware configuration used in the first embodiment of the invention will be described based on FIGS. 1 to 3. Reference symbol 1 denotes a conveying traveling body, and reference symbol 2 denotes an immersion treatment bath disposed along a traveling path of the conveying traveling body 1. The conveying traveling body 1 includes a travel drive means 3, a rotary shaft 4 horizontally extending from the conveying traveling body 1 to a side where the immersion treatment bath 2 is located, a rotary shaft drive means 5 rotationally driving the rotary shaft 4, and a traveling speed control device 6 controlling the traveling speed of the conveying traveling body 1.

The travel drive means 3 of the conveying traveling body 1 is equipped with a front driving bogie 8 and a rear driven bogie 9 engaged with a single guide rail 7 laid on the traveling path. The both bogies 8, 9 are attached on bottom portions of the conveying traveling body 1 so as to be rotatable about vertical axes respectively, and are provided with wheels 8a, 9a rolling on an upper horizontal rail portion of the guide rail 7 using an H-section steel, front and rear pairs of left and right position controlling rollers 8b, 9b sandwiching a vertical plate portion of the guide rail 7 and being rotatable about vertical axes. The driving bogie 8 is provided with a speed reducer equipped motor 10 rotationally driving the wheel 8a. Thus, the speed reducer equipped motor 10 of the driving bogie 8 is operated to rotationally drive the wheel 8a, thereupon allowing the conveying traveling body 1 to travel forward along the guide rail 7. Both of the front and rear bogies 8, 9 rotate about vertical axial centers with respect to the conveying traveling body 1, therewith allowing for smooth traveling on a horizontally curved path portion as well. In this connection, it can be configured such that the same driving bogie as the front driving bogie 8 is attached instead of the rear driven bogie 9 and either one of the wheels 8a of the front and rear driving bogies 8 is driven selectively depending on the traveling path section.

The rotary shaft 4 is such that a driving shaft portion 4a concentrically connected to an end portion on the conveying traveling body 1 side is horizontally supported by a pair of left and right bearings 11a, 11b attached on the conveying traveling body 1, and a supporting roller 12 is pivotally supported at the other end of the rotary shaft 4 by a support shaft parallel to the rotary shaft 4. On a side opposite to the side where the guide rail 7 of the conveying traveling body 1 is located with respect to the immersion treatment bath 2, a guide rail 13 is laid parallel to the guide rail 7, and the supporting roller 12 is rollably supported on the guide rail 13. As a result, the rotary shaft 4 is configured to be moved together with the conveying traveling body 1 while maintaining a left-right horizontal position. A workpiece supporting means 14 is attached to this rotary shaft 4. The workpiece supporting means 14 supports a vehicle body W of an automobile which is a workpiece to be treated, with a length direction thereof parallel to the traveling direction of the conveying traveling body 1. Although a detailed structure is not shown, the workpiece supporting means 14 can fix the vehicle body W firmly in a state allowing its own supporting vehicle body W to be safely rotated about the rotary shaft 4 by rotation of the rotary shaft 4, as conventionally known.

The rotary shaft drive means 5 rotationally driving the rotary shaft 4 is constituted of a larger diameter spur gear 15 attached to the driving shaft portion 4a of the rotary shaft 4, a speed reducer equipped motor 16 installed on the conveying traveling body 1, and a smaller diameter spur gear 17 attached to an output shaft of this speed reducer equipped motor 16 and meshing with the larger diameter spur gear 15. The traveling speed control device 6 controls the traveling speed of the conveying traveling body 1, that is, the rotational speed of the speed reducer equipped motor 10 of the travel drive means 3 according to changes in the angle of rotation of the rotary shaft 4, and a speed control program is set in advance.

The traveling speed control over the conveying traveling body 1 by the traveling speed control device 6 is for changing the forward rolling locus at the time when the vehicle body W supported by the workpiece supporting means 14 is turned about the rotary shaft 4 in the forward rolling manner by rotational drive of the rotary shaft 4, so as to fit the purpose. First, a reference configuration for mechanically obtaining the similar forward rolling locus will be described based on FIG. 4.

On the conveying traveling body 1, there is mounted a movable base 20 movable back and forth in the traveling direction of the conveying traveling body 1 on a guide rail 18 laid on the conveying traveling body 1 via a slide guide 19. On this movable base 20, the rotary shaft 4 and the rotary shaft drive means 5 thereof are mounted. The driving shaft portion 4a of the rotary shaft 4 has a free end fixed with a revolving arm 21 erected vertically upward when the vehicle body W supported by the workpiece supporting means 14 is in an upright position of being horizontally and longitudinally positioned just above the rotary shaft 4. A vertical guide rail 22 is fixed to the conveying traveling body 1 side so as to coincide with the outside of the revolving arm 21 in the vertically upward position. An engaging member, for example, a roller 23 engaged with the guide rail 22 vertically movably in the length direction (the vertical direction) is pivotally supported at the outside of a free end of the revolving arm 21. The guide rail 22 has a vertical length such that the roller 23 is not detached from upper and lower ends at the time when the revolving arm 21 turns one revolution. An intermediate position of the guide rail 22 is attached to the conveying traveling body 1 by a support member 24 securing a turning space of the revolving arm 21 between the guide rail 22 and a side of the conveying traveling body 1.

Figure 4:
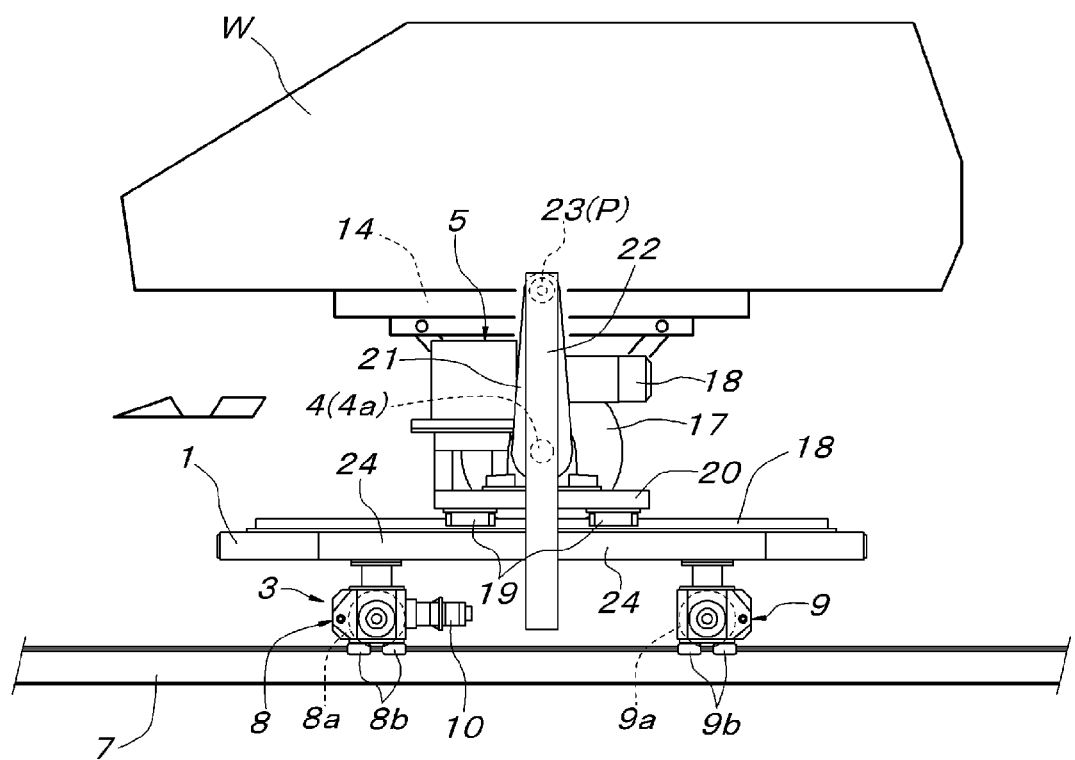
FIG. 4 is a side view of a conveying traveling body configured such that the position of a rotary shaft for rotationally driving a workpiece support base is moved back and forth in the conveying traveling body traveling direction on the conveying traveling body without performing a traveling speed control over the conveying traveling body.

In the configuration shown in FIG. 4, when the rotary shaft 4 (the driving shaft portion 4a) is rotationally driven to turn the vehicle body W supported on the workpiece supporting means 14 in the forward rolling manner about the rotary shaft 4, the roller 23 of the revolving arm 21 rotating together pushes and pulls the movable base 20 to which the revolving arm 21 is pivotally supported, in a direction opposite to the direction of the revolving arm 21 with respect to the rotary shaft 4 along with vertical movement within the vertical guide rail 22 fixed to the conveying traveling body 1 side, therewith reciprocating the rotary shaft 4, rotary shaft drive means 5, workpiece supporting means 14 and vehicle body W supported to the movable base 20, with respect to the conveying traveling body 1.

More specifically, as shown in FIGS. 5A to 5E, letting the position of the roller 23 located in a position at a fixed distance from the rotary shaft 4 and in a fixed position when viewed from the vehicle body W when the motion of the vehicle body W supported by the workpiece supporting means 14 at the time of rotating the rotary shaft 4 to turn the vehicle body W in the forward rolling manner is viewed from the conveying traveling body 1 be the reference position P on the vehicle body W side, the reference position P on the vehicle body W side moves up and down on a vertical coordinate axis in agreement with the guide rail 22, that is, a reference coordinate axis X. Letting a vertical coordinate axis passing through the axial center of the rotary shaft 4 on the movable base 20 reciprocating back and forth relative to the conveying traveling body 1 be a control target coordinate axis x, the control target coordinate axis x agrees with the reference coordinate axis X and the amount of forward and rearward displacement δx is zero in the upright position (FIG. 5A) where the vehicle body W is positioned horizontally and forward-facing just above the rotary shaft 4 and a 180° rotation position (FIG. 5C) where the vehicle body W is positioned horizontally and rearward-facing just under the rotary shaft 4. The control target coordinate axis x is away rearward with respect to the reference coordinate axis X by the amount of displacement −δx corresponding to the radius R of rotation of the roller 23 in a 90° rotation position (FIG. 5B) where the vehicle body W is turned 90 degrees in the forward rolling direction from the upright position (FIG. 5A). On the contrary, the control target coordinate axis x is away forward with respect to the reference coordinate axis X by the amount of displacement δx corresponding to the radius R of rotation of the roller 23 in a 270° rotation position (FIG. 5D) where the vehicle body W is turned further 90 degrees from the 180° rotation position (FIG. 5C).

The amount of displacement δx of a horizontal distance in the traveling direction of the conveying traveling body 1 between the reference position P on the vehicle body W side turning about the rotary shaft 4 in the forward rolling manner at the radius R with respect to the rotary shaft 4 and the rotary shaft 4, that is, a horizontal distance of the control target coordinate axis x with respect to the reference coordinate axis X involved in changes in the angle of rotation θ of the revolving arm 21 takes a value where δx=X−R sin θ holds, letting the angle of rotation θ of the revolving arm 21 at the time when the vehicle body W is in the upright position (FIG. 5A) be zero. Thus, the forward rolling locus of the vehicle body W, when viewed from the reference coordinate axis X, takes a vertically long shape such that a front-rear horizontal width is narrower than the height.

To make the forward rolling locus of the vehicle body W vertically long, the conveying traveling body 1 itself moves back and forth with respect to the reference coordinate axis X so as to make the position of the rotary shaft 4 agree with the control target coordinate axis x while the position of the rotary shaft 4 is fixed on the conveying traveling body 1, instead of mechanically reciprocating the position of the rotary shaft 4 on the conveying traveling body 1 back and forth as above.

Figure 6A:
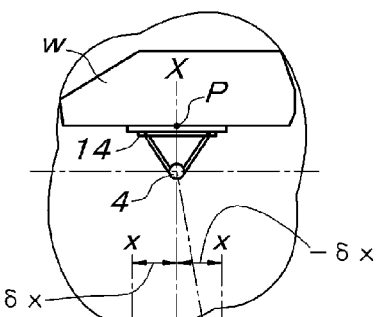
FIGS. 6A to 6E are explanatory diagrams of operation in the conveying traveling body of the invention shown in FIG. 3.
Figure 6B:
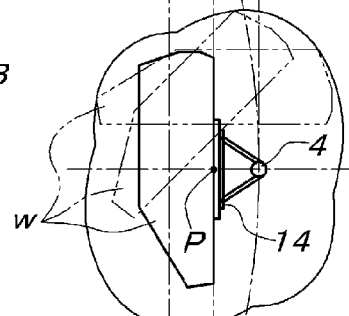
Figure 6C:
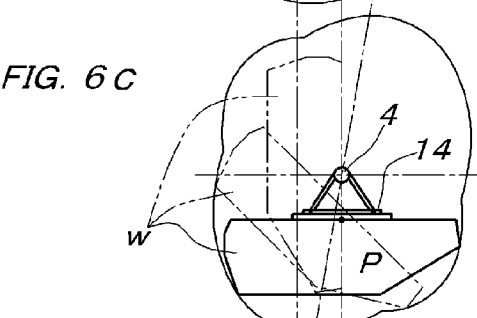
Figure 6D:
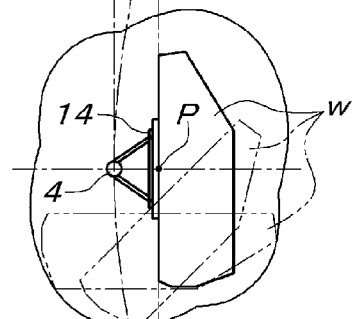
Figure 6E:
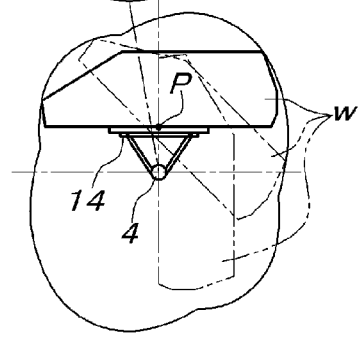

More specifically, the present invention makes it a precondition that the conveying traveling body 1 is speed-controlled such that the reference coordinate axis X passing through the reference position P on the vehicle body W side corresponding to the position of the roller 23 moves forward at a fixed reference conveying speed. As shown in FIG. 6, the traveling speed control over the conveying traveling body 1 is performed such that the forward speed of the conveying traveling body 1 is gradually decreased until the vehicle body W reaches the 90° rotation position (FIG. 6B) in the forward rolling direction from the upright position (FIG. 6A), and that the control target coordinate axis x passing through the position of the rotary shaft 4 is apart rearward only by −δx with respect to the reference coordinate axis X when the vehicle body W reaches the 90° rotation position (FIG. 6B), and that the forward speed of the conveying traveling body 1 is gradually increased until the vehicle body W reaches the 180° rotation position (FIG. 6C) from the 90° rotation position (FIG. 6B), and that the control target coordinate axis x passing through the position of the rotary shaft 4 agrees with the reference coordinate axis X and simultaneously the forward speed of the conveying traveling body 1 is returned to the reference conveying speed when the vehicle body W reaches the 180° rotation position (FIG. 6C), and that the forward speed of the conveying traveling body 1 is gradually increased until the vehicle body W reaches the 270° rotation position (FIG. 6D) from the 180° rotation position (FIG. 6C), and that the control target coordinate axis x passing through the position of the rotary shaft 4 is apart forward only by δx with respect to the reference coordinate axis X when the vehicle body W reaches the 270° rotation position (FIG. 6D), and that the forward speed of the conveying traveling body 1 is gradually decreased until the vehicle body W is returned to the original upright position (FIG. 6E, FIG. 6A) from the 270° rotation position (FIG. 6D), and that the control target coordinate axis x passing through the position of the rotary shaft 4 agrees with the reference coordinate axis X and simultaneously the forward speed of the conveying traveling body 1 is returned to the reference conveying speed when the vehicle body W reaches the original upright position (FIG. 6E, FIG. 6A). By this, the forward rolling locus of the vehicle body W, assuming that the reference conveying speed of the reference coordinate axis X is zero, has a vertically long shape such that the width in the front-rear horizontal direction is narrower than the height, which is the same as the foregoing vertically long forward rolling locus previously described based on FIG. 4 and FIG. 5.

Figure 2:
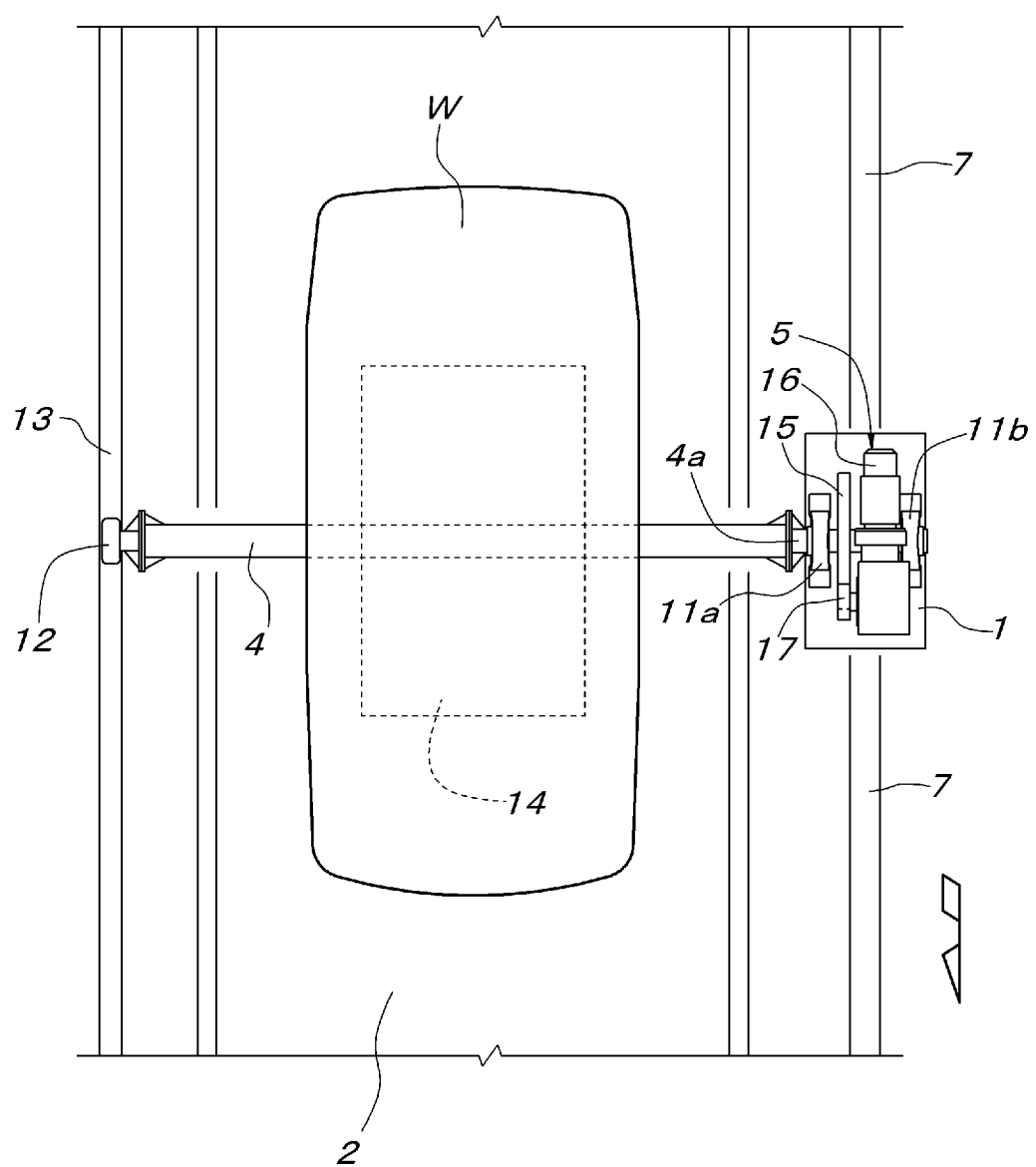
FIG. 2 is a plan view of the same.
Figure 3:
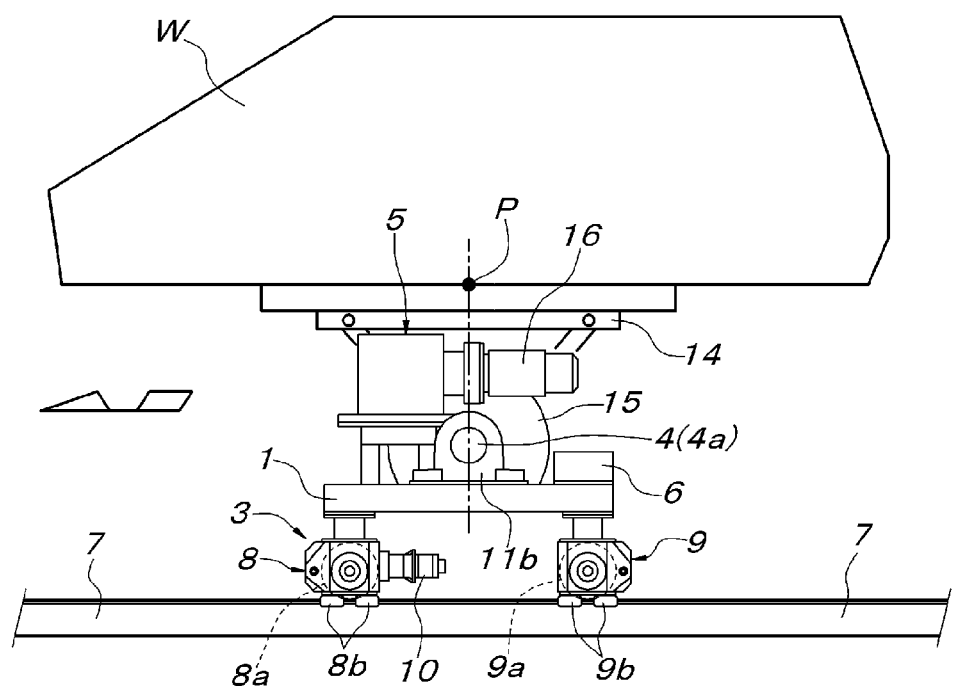
FIG. 3 is a side view of a conveying traveling body.

That is, as shown in FIGS. 1 to 3, the forward speed of the conveying traveling body 1 traveling forward at the reference conveying speed by the travel drive means 3 is increased or decreased by the traveling speed control device 6, when the vehicle body W is turned about the rotary shaft 4 in the forward rolling manner by rotating the rotary shaft 4 provided for the fixed position on the conveying traveling body 1 by the rotary shaft drive means 5. At this moment, the traveling speed control device 6 is configured such that the forward speed of the conveying traveling body 1 is increased or decreased in order that the amount of displacement δx at the time when the control target coordinate axis x (passing through the axial center of the rotary shaft 4) moves back and forth in the conveying traveling body traveling direction, with respect to the reference coordinate axis X (passing through the reference position P on the vehicle body W side apart from the rotary shaft 4 by the fixed radius R) takes a value where δx=X−R sin θ holds, letting the angle of rotation θ of the rotary shaft 4 at the time when the vehicle body W is in the upright position and the reference coordinate axis X and the control target coordinate axis x agree, be zero. In other words, a speed control program in which the radius R of rotation of the reference position P which is a fixed value and the foregoing equation are set and also positional information of the reference coordinate axis X on the traveling path of the conveying traveling body 1 (positional information of the reference coordinate axis X changing at the fixed reference conveying speed) and information of the angle of rotation θ of the rotary shaft 4 are input as variables is set in the traveling speed control device 6. As a result that the increase/decrease speed control of the forward speed of the conveying traveling body 1 is executed by this program, the position of the rotary shaft 4 (the control target coordinate axis x) is moved back and forth so as for the foregoing equation to hold while the reference position P on the vehicle body W side (the reference coordinate axis X) is moved forward at the fixed reference conveying speed as above, whereby the forward rolling locus of the vehicle body W, assuming that the reference conveying speed is zero, can be changed to be vertically long.

Figure 7A:
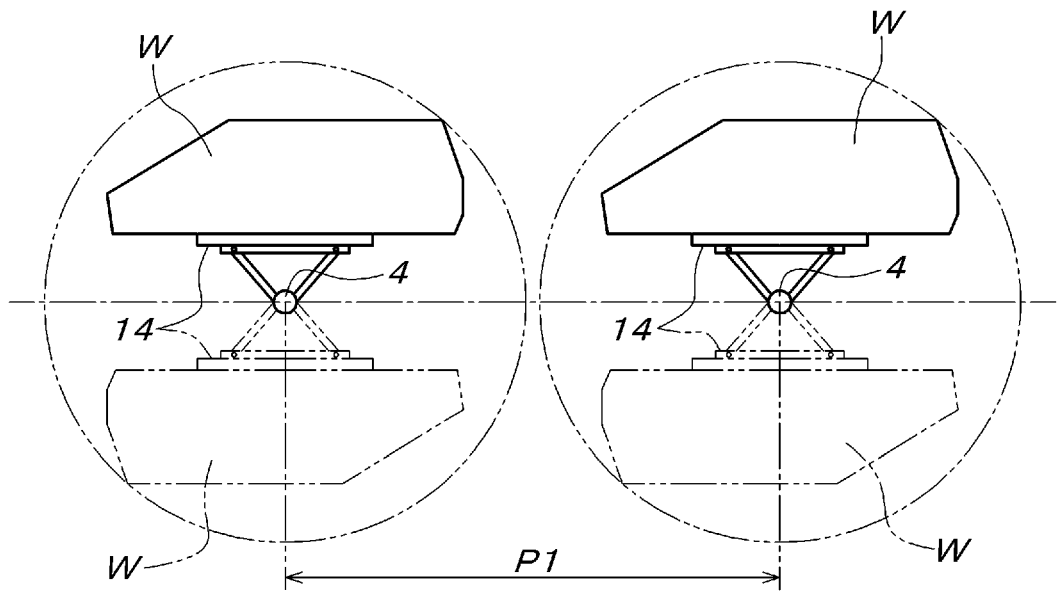
FIG. 7A is a schematic side view showing a forward rolling locus of a workpiece at the time when the conveying traveling body is not speed-controlled.
Figure 7B:
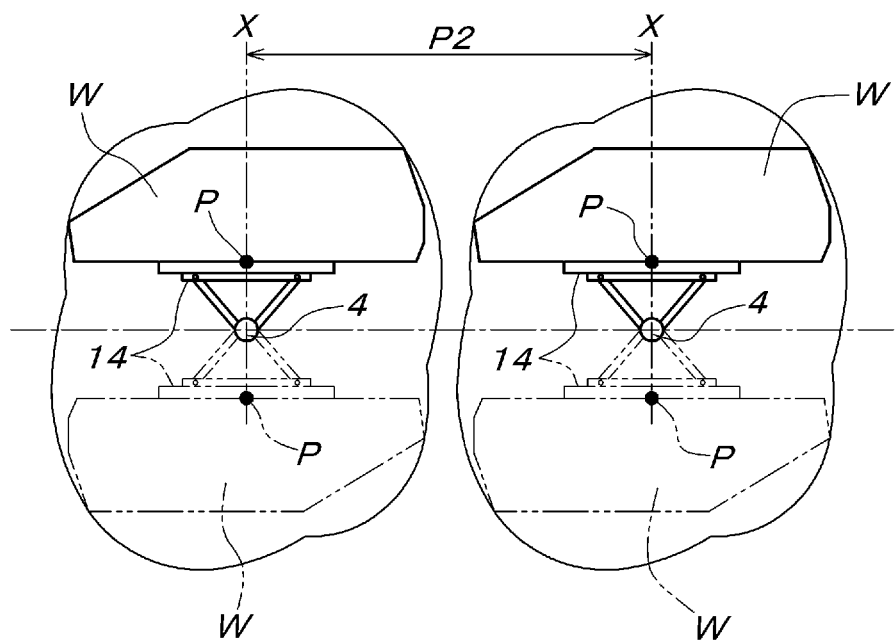
FIG. 7B is a schematic side view showing a forward rolling locus of a workpiece in the invention.

According to the foregoing configuration of the invention, the forward rolling locus of the vehicle body W becomes vertically long and the forward and rearward jutting can be reduced to be small as shown in FIG. 7B as compared with the forward rolling locus of the vehicle body W which becomes a perfect circle when the conveying traveling body 1 is not speed-controlled and the rotary shaft 4 is rotated in the fixed position on the conveying traveling body 1 as shown in FIG. 7A. Accordingly, when a pitch between the conveying traveling bodies 1 is set such that the vehicle bodies W on the adjacent conveying traveling bodies 1 are not in danger of contacting each other even if the vehicle bodies W are rotated in any timing, that is, the forward rolling locus of the vehicle body W in each conveying traveling body 1 is not overlapped with each other and the vehicle bodies W are apart while keeping a safe interval, a pitch P2 between the vehicle bodies W can be narrowed in the invention as shown in FIG. 7B relative to a pitch P1 between the conventional conveying traveling bodies (between the vehicle bodies W) shown in FIG. 7A.

In this connection, the pitch P2 between the vehicle bodies W in the invention shown in FIG. 7B is a pitch between the reference positions P having been set on the side of the vehicle bodies W and not a pitch between the conveying traveling bodies 1. Basically, each conveying traveling body 1 travels forward at the same reference conveying speed so as to maintain this pitch P2. However, each conveying traveling body 1 is controlled in speed which is increased or decreased with respect to the reference conveying speed under the circumstances of turning the vehicle body W in the forward rolling manner to undergo the immersion treatment within the immersion treatment bath 2. Thus, the pitch between the conveying traveling bodies 1 changes to maintain the pitch P2 between the vehicle bodies W (between the reference positions P of the vehicle bodies W). Accordingly, the conveying traveling body 1 needs to be shortened to an extent of always fitting within the range of the forward rolling locus of the vehicle body W which becomes vertically long, including the amount of forward and rearward movement with respect to the reference coordinate axis X in the case of performing the increase/decrease speed control with respect to the reference conveying speed as above. By thus setting and configuring the entire length of the conveying traveling body 1, there is no possibility that front and rear adjacent conveying traveling bodies 1 or the vehicle bodies W on these conveying traveling bodies 1 interfere with each other even if the vehicle body W on each conveying traveling body 1 is turned in the forward rolling manner in any given timing, when each conveying traveling body 1 travels within the immersion treatment section equipped with the immersion treatment bath 2. Accordingly, the rotational drive of the rotary shaft 4 and the increase/decrease speed control of the traveling speed of the conveying traveling body 1 by the traveling speed control device 6 are performed in the order in which each conveying traveling body 1 enters into the immersion treatment section, thereby being able to turn the vehicle body W on each conveying traveling body 1 in the forward rolling manner and put the vehicle body W through while being immersed in the treatment liquid within the immersion treatment bath 2, and in the order of leaving from within the immersion treatment section, the vehicle body W on each conveying traveling body 1 can be returned to the original upright position and conveyed.

Figure 8:
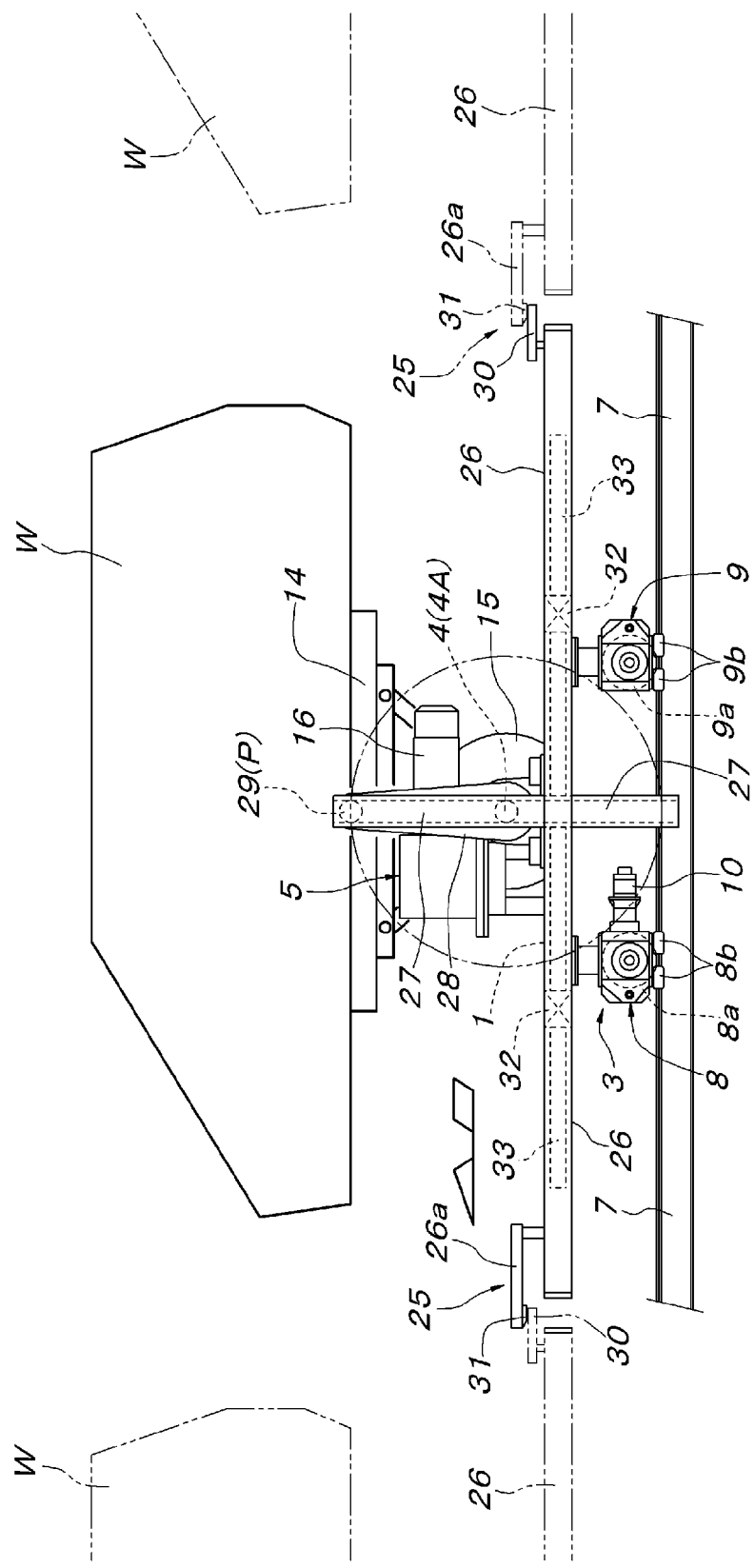
FIG. 8 is a side view showing the second embodiment.

When the invention is carried out, the possibility that the current position of the conveying traveling body 1 accidentally varies from the theoretical position for various reasons as described earlier cannot be denied. The second embodiment for coping with such instance will be described based on FIGS. 8 to 10.

In this second embodiment, each conveying traveling body 1 is provided with a detection means 25 detecting a state that an interval in the conveying traveling body traveling direction between the reference positions P on the side of the vehicle bodies W of the front and rear adjacent conveying traveling bodies 1 (the pitch P2 shown in FIG. 7B) is narrower than a set value. More specifically, this detection means 25 is constituted of a rod-shaped movable body 26 supported to the conveying traveling body 1 so as to be reciprocable in the traveling direction, a vertical guide rail 27 attached to this rod-shaped movable body 26, a revolving arm 28 rotating together with the rotary shaft 4, a roller 29 as an engaging member pivotally supported to a distal end side of this revolving arm 28 so as to agree with the reference position P on the vehicle body W side and engaged with the guide rail 27 vertically movably, a portion to be detected 30 provided for one end of the rod-shaped movable body 26, and a detector 31 provided for the other end of the rod-shaped movable body 26.

A more detailed description will be given. The rod-shaped movable body 26 has the entire length longer than the maximum width in the front-rear direction of the vertically long forward rolling locus of the vehicle body W at the time when the reference position P of the vehicle body W is not moved in the traveling direction of the conveying traveling body 1 but shorter than the pitch P2 between the reference positions P of the vehicle bodies W shown in FIG. 7B. The rod-shaped movable body 26 is supported at a lateral side portion of the conveying traveling body 1 via a slide guide 32 attached to the conveying traveling body 1 side and a slide rail 33 attached to the rod-shaped movable body 26 along the length direction thereof and engaged with the slide guide 32. The vertical guide rail 27 has the entire length a little over twice the radius of rotation of the roller 29 involved in the rotation of the revolving arm 28, and is fixed inside of a substantially central position in the length direction of the rod-shaped movable body 26 such that a central position in the length direction of the vertical guide rail 27 agrees with the position of the rotary shaft 4. The portion to be detected 30 is attached at the topside of the rear end of the rod-shaped movable body 26 so as to extend rearward. The detector 31 is attached on the downside of a distal end of a mounting member 26a attached so as to extend forward from a topside of the front end of the rod-shaped movable body 26 at a level higher than the portion to be detected 30. The detector 31 faces the topside of the portion to be detected 30 of the rod-shaped movable body 26 of the immediately preceding conveying traveling body 1 at a small distance and detects the portion to be detected 30 when the interval in the conveying traveling body traveling direction between the reference positions P on the side of the vehicle bodies W (the rollers 29) of the front and rear adjacent conveying traveling bodies 1 is narrowed to the set value or less.

Figure 9:
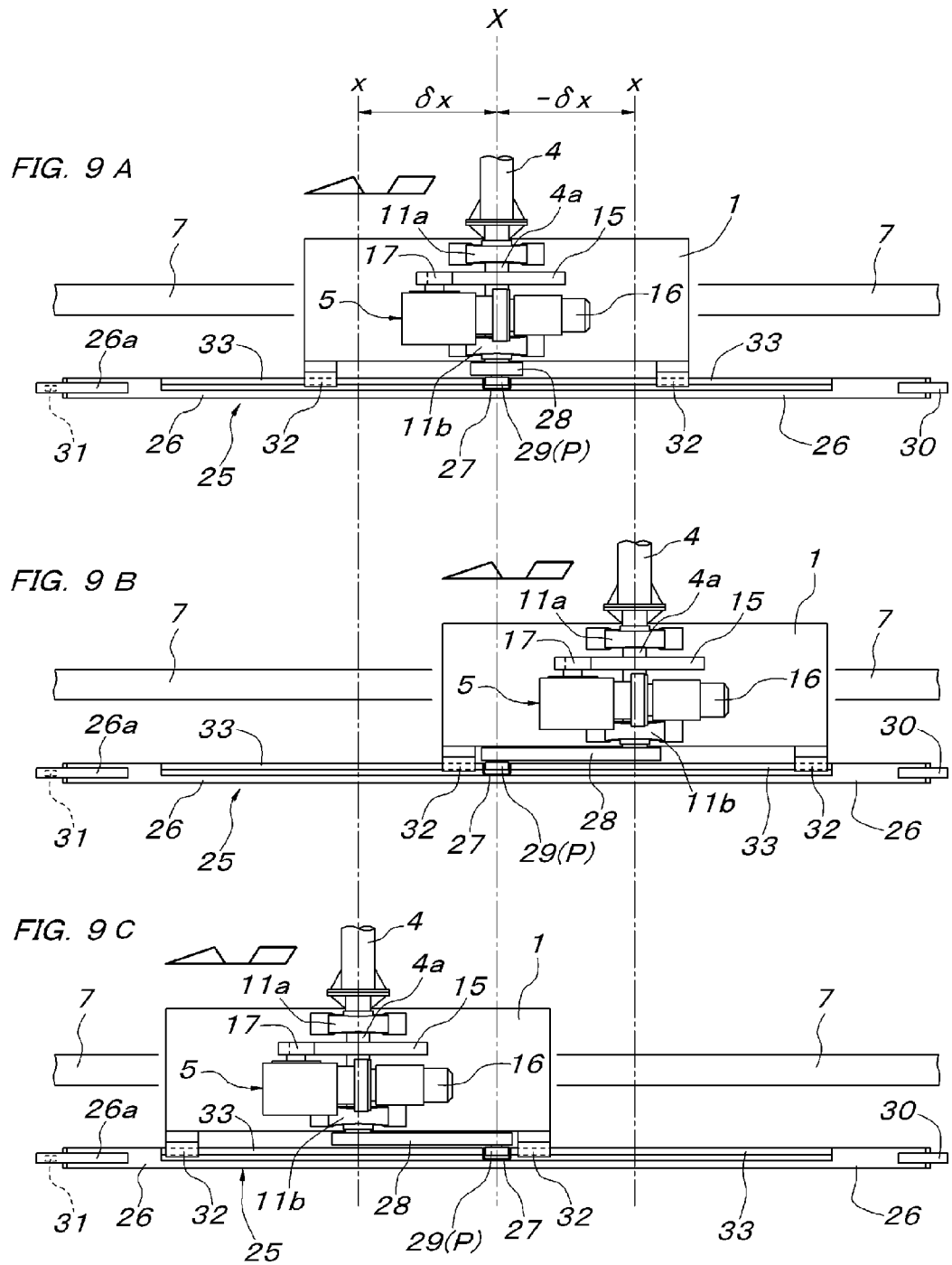
FIGS. 9A to 9C are plan views explaining operation of the same second embodiment.
Figure 10:
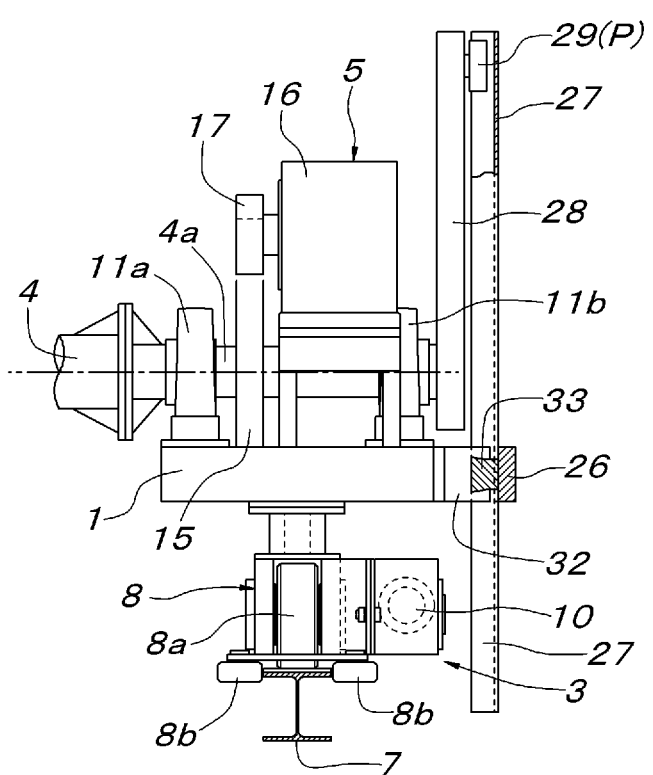
FIG. 10 is a partial longitudinal sectional front view showing a main part of the same second embodiment.

According to the foregoing configuration of the second embodiment, the revolving arm 28 turning about the rotary shaft 4 together with the vehicle body W reciprocates the rod-shaped movable body 26 back and forth with respect to the conveying traveling body 1 via the roller 29 and the guide rail 27 when the rotary shaft 4 is rotated to turn the vehicle body W in the forward rolling manner. Since the guide rail 27 into which the roller 29 located in the reference position P on the vehicle body W side is fitted and the rod-shaped movable body 26 are integrated, the reference position P on the vehicle body W side (the roller 29) and the rod-shaped movable body 26 are not relatively moved in the traveling direction of the conveying traveling body 1 as shown in FIG. 9. In other words, in any case where the vehicle body W in the upright position is conveyed by each conveying traveling body 1 or where the increase/decrease speed control over the forward speed of the conveying traveling body 1 is performed when the vehicle body W is turned about the rotary shaft 4 in the forward rolling manner, the position of the rod-shaped movable body 26 does not vary with respect to the reference coordinate axis X passing through the reference position P on the vehicle body W side (the roller 29). Therefore, a fixed interval is secured between the rod-shaped movable bodies 26 of the respective conveying traveling bodies 1 while the reference position P on the vehicle body W side travels forward at the reference conveying speed with the pitch P2 shown in FIG. 7B maintained. Under these circumstances, the detector 31 at the front end of the rod-shaped movable body 26 provided for the rear conveying traveling body 1 is positioned slightly apart rearward with respect to the portion to be detected 30 at the rear end of the rod-shaped movable body 26 provided for the front conveying traveling body 1, and the state that the detector 31 does not detect the portion to be detected 30 is maintained.

If variations in the actual forward speed of each conveying traveling body 1 occur for various reasons as described earlier and the interval in the conveying traveling body traveling direction between the reference positions P on the side of the vehicle bodies W supported and conveyed by the respective conveying traveling bodies 1 is varied, the rod-shaped movable body 26 of the rear conveying traveling body 1 of two conveying traveling bodies 1 adjoining in the front-rear direction, which becomes relatively faster in the reference conveying speed of the reference position P on the vehicle body W side, relatively approaches the rod-shaped movable body 26 of the front conveying traveling body 1 which becomes slower. The detector 31 provided for the front end of the rod-shaped movable body 26 of the rear conveying traveling body 1 overlaps the portion to be detected 30 provided for the rear end of the rod-shaped movable body 26 of the front conveying traveling body 1, therewith detecting the portion to be detected 30.

More specifically, that the interval in the conveying traveling body traveling direction between the reference positions P on the side of the vehicle bodies W is narrowed can be detected by the detector 31 of the rear conveying traveling body 1 forming this interval. Therefore, based on the signal of this detector 31, the rear conveying traveling body 1 provided with this detector 31 and traveling forward at a relatively higher speed is decreased in speed until the detection signal from this detector 31 becomes OFF, whereby the interval in the conveying traveling body traveling direction between the reference positions P on the side of the vehicle bodies W can be corrected to be widened. As a matter of course, it is also possible to automatically actuate a warning means which notifies abnormal conditions based on the detection signal of the detector 31, and also possible for example to automatically stop each conveying traveling body 1 before the immersion treatment section equipped with the immersion treatment bath 2 based on the detection signal, to perform a forward speed control based on the detection signal for avoiding narrowing the interval in the conveying traveling body traveling direction between the reference positions P on the side of the vehicle bodies W, over every conveying traveling body 1 of all conveying traveling bodies 1 within the immersion treatment section and downstream of this section, and to automatically stop all conveying traveling bodies 1 at the point when all conveying traveling bodies 1 within the immersion treatment section leave downstream from this section.

Further, it can also be configured such that the portion to be detected 30 is provided in two stages front and rear, and the detector 31 detects the portion to be detected in the first stage (the rear side) thereby to perform the foregoing speed reduction control over the rear conveying traveling body 1, and the detector 31 detects the portion to be detected in the second stage (the front side) thereby to bring the rear conveying traveling body 1 and all conveying traveling bodies 1 upstream of the same to an emergency stop. Furthermore, it can be configured such that the rod-shaped movable bodies 26 of the front and rear conveying traveling bodies 1 collide with each other and the interval between the reference positions P on the side of the vehicle bodies W of the front and rear conveying traveling bodies 1 is mechanically and forcibly suppressed from being narrowed any further when the speed reduction control over the rear conveying traveling body 1 after the detector 31 detects the portion to be detected 30 is not performed as intended and the detector 31 passes forward above the portion to be detected 30. As a matter of course, the interval between the reference positions P on the side of the vehicle bodies W of the front and rear conveying traveling bodies 1 is configured to be minimized within an allowable range when the rod-shaped movable bodies 26 of the front and rear conveying traveling bodies 1 collide with each other.

The traveling type immersion treatment apparatus of the invention can be utilized in a vehicle body coating system as a means for carrying out immersion treatment of a vehicle body supported upward and horizontally on a conveying traveling body by rotating the vehicle body in a treatment liquid while conveying the vehicle body.

What is claimed is:

1. A traveling type immersion treatment apparatus comprising:
a conveying traveling body traveling along an immersion treatment bath, the conveying traveling body having a rotary shaft horizontally crossing above the immersion treatment bath, a rotary shaft drive means rotationally driving the rotary shaft, a workpiece supporting means connected to the rotary shaft, and a workpiece to be treated supported by the workpiece supporting means, whereby the workpiece can be immersed within the immersion treatment bath by rotation of the rotary shaft,
the conveying traveling body having a traveling speed variable travel drive means and a traveling speed control device operable to control a traveling speed of the conveying traveling body in response to an angle of rotation of the rotary shaft,
the traveling speed control device being operable to perform control such that (i) while the workpiece moves to a 90° rotation position in a forward rolling direction from an upright position horizontally positioned above the rotary shaft, a forward speed of the conveying traveling body is gradually decreased from a reference conveying speed of a reference position on the workpiece located at a fixed distance from an axial center of the rotary shaft, (ii) while the workpiece moves to a 270° rotation position from the 90° rotation position, the forward speed of the conveying traveling body is gradually increased, and (iii) while the workpiece returns to the original upright position from the 270° rotation position, the forward speed of the conveying traveling body is gradually decreased, and
a forward rolling locus of the workpiece, assuming that the reference conveying speed is zero, is configured to be a vertically long shape.

2. The traveling type immersion treatment apparatus according to claim 1, further comprising a plurality of conveying traveling bodies on a traveling path wherein each conveying traveling body is arranged such that intervals in a conveying traveling body traveling direction between reference positions on workpieces of front and rear adjacent conveying traveling bodies are equal, and a traveling speed control device of each conveying traveling body controls forward speeds of the respective conveying traveling body such that a reference conveying speed of the reference position of the workpiece of each conveying traveling body is equal to each other.

3. The traveling type immersion treatment apparatus according to claim 2, wherein each conveying traveling body is provided with a detection means for detecting a state that an interval in the conveying traveling body traveling direction between the reference positions on the workpieces of the front and rear adjacent conveying traveling bodies is narrowed.

4. The traveling type immersion treatment apparatus according to claim 3, wherein the detection means comprises a rod-shaped movable body supported to the associated conveying traveling body so as to be reciprocable in the traveling direction, a vertical guide rail attached to the rod-shaped movable body, a revolving arm rotating together with the rotary shaft, an engaging member pivotally supported to a distal end of the revolving arm so as to agree with the reference position on the workpiece, the engaging member vertically movably engaged with the vertical guide rail, a portion to be detected provided on one end of the rod-shaped movable body, and a detector provided on the other end of the rod-shaped movable body for detecting a portion to be detected of the rod-shaped movable body of an adjacent conveying traveling body when the interval in the conveying traveling body traveling direction between the reference positions on the workpieces of the front and rear adjacent conveying traveling bodies is narrowed.

5. The traveling type immersion treatment apparatus according to claim 1, wherein the traveling speed control device is operable to perform traveling speed control over the conveying traveling body such that $\delta x = X - R \sin \theta$, where a vertical coordinate axis passing through the reference position on the workpiece is a reference coordinate axis X, a vertical coordinate axis passing through an axial center of the rotary shaft is a control target coordinate axis x, an amount of displacement in the conveying traveling body traveling direction of the control target coordinate axis x with respect to the reference coordinate axis X as a result of the traveling speed control over the conveying traveling body is $\delta x$, the radius of rotation of the reference position about the rotary shaft is R, the angle of rotation of the rotary shaft is $\theta$, and the angle of rotation $\theta$ at the time when the workpiece is in the upright position and the reference coordinate axis X and the control target coordinate axis x agree is zero.

6. The traveling type immersion treatment apparatus according to claim 5, wherein the conveying traveling body is provided with a detection means for detecting a state that an interval in the conveying traveling body traveling direction between the reference position on the workpiece of the conveying traveling bodies and a corresponding reference position on a front or rear adjacent conveying traveling body is narrowed.

* * * * *